United States Patent Office 3,223,873
Patented Dec. 14, 1965

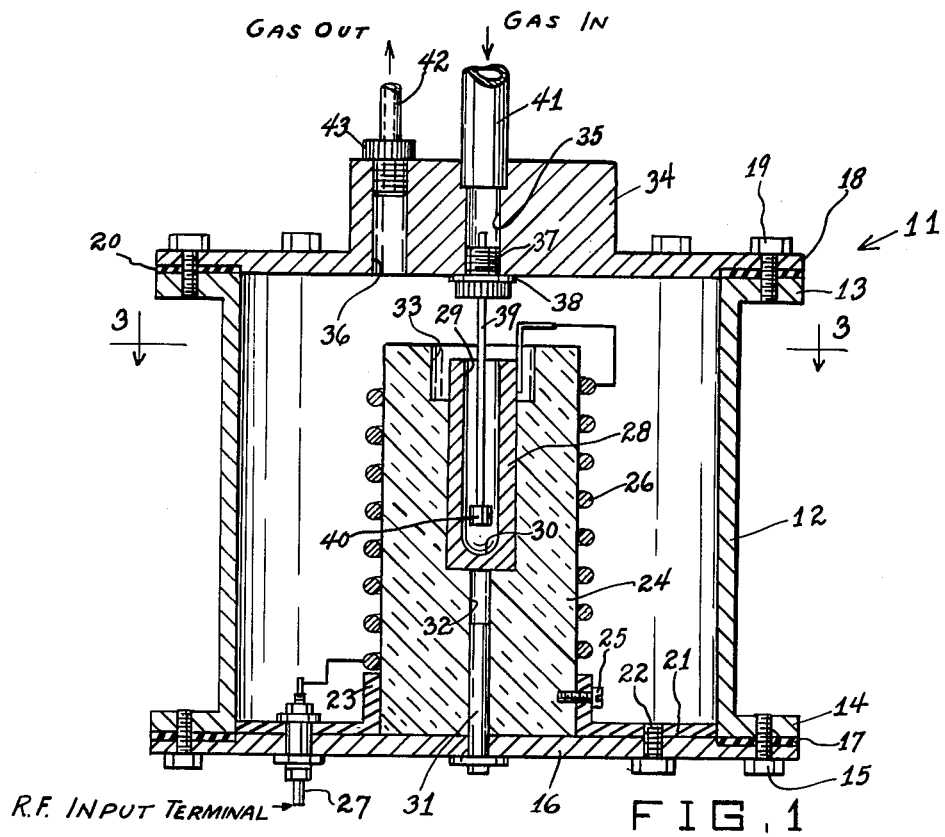
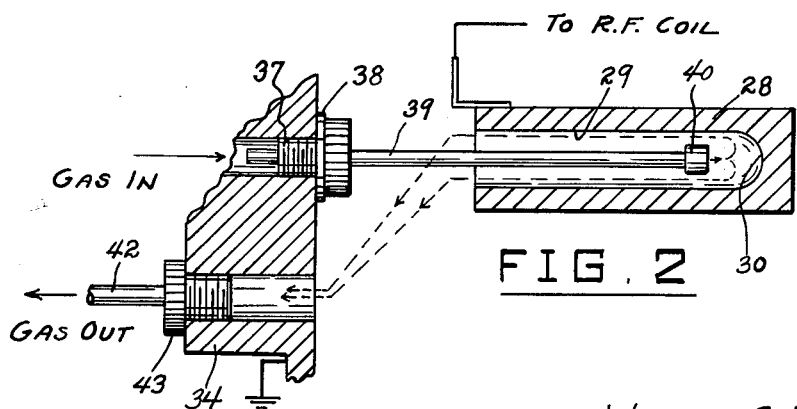

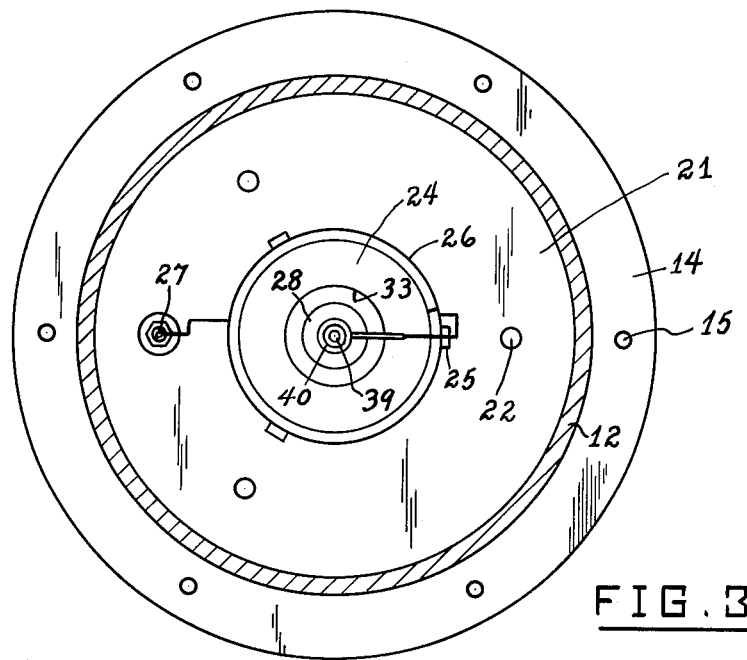
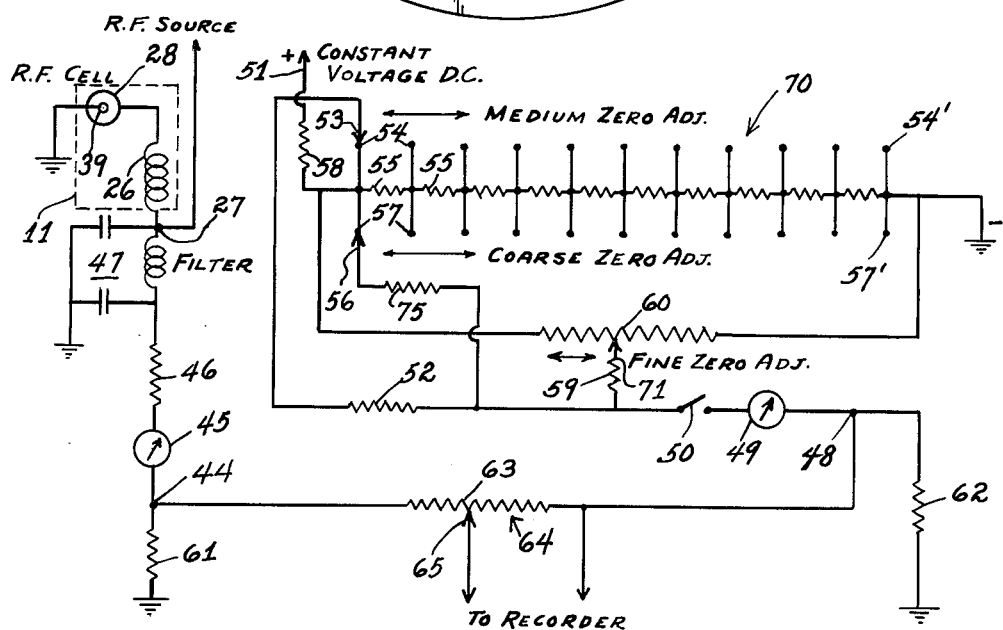
FIG.3
FIG.4

3,223,873
RADIO FREQUENCY CELL FOR GAS CHROMATOGRAPHY
William C. Hampton, Takoma Park, Md., assignor to American Instrument Company, Inc., Silver Spring, Md.
Filed May 6, 1963, Ser. No. 278,008
7 Claims. (Cl. 313—161)

This invention relates to gas chromatography apparatus, and more particularly to a radio frequency detector cell for use in detecting components separated from a sample carrier gas.

A main object of the invention is to provide a novel and improved radio frequency gas detector cell for use in gas chromatography, said cell being relatively simple in construction, being stable in operation, and being highly sensitive to the presence of various components in a sample mixture of gas contained in the cell, whereby said components may be accurately and easily detected.

A further object of the invention is to provide an improved radio frequency gas detector cell and associated circuit apparatus for use in gas chromatography, the apparatus comprising only a few parts, being safe to use, having a high workable sensitivity, having improved baseline stability, and accommodating large sample volumes of carrier gas, whereby relatively small amounts of component material in the carrier gas may be detected.

A still further object of the invention is to provide an improved radio frequency detector cell for use in gas chromatography apparatus, said cell being easy to disassemble for cleaning, being relatively compact in size and easy to mount, and being mechanically sturdy.

A still further object of the invention is to provide an improved radio frequency gas detector cell of the type employed with a concentric ballast coil connected in series therewith to regulate the current flow when electrical discharge occurs in the gas contained in the cell, the arrangement of the ballast coil being such that the ballast coil forms an electrical field external to the cell, the ballast coil being mounted on an insulating form which also serves as a centering and supporting means for one of the radio frequency gas ionizing electrodes, the electrical discharge heating effects and other heating effects derived from the concentric arrangement of the electrodes and the ballast coil being utilized to minimize gas condensation effects in the cell ionization chamber.

A still further object of the invention is to provide an improved radio frequency gas detector cell for gas chromatography which has a grounded exterior, so that it is safe to handle, which can be utilized to detect gaseous components having a wide range of boiling points, and which is substantially completely electrically shielded so as to produce substantially no radio interference.

Further objects and advantages of the invention will become apparent from the following description and claims, and from the accompanying drawings, wherein:

FIGURE 1 is a vertical cross-sectional view taken through an improved radio frequency gas detector cell constructed in accordance with the present invention.

FIGURE 2 is an enlarged fragmentary cross-sectional view of portions of the cell of FIGURE 1, showing the paths of flow of gas streams through the ionizing electrode chamber of the cell.

FIGURE 3 is a horizontal cross-sectional view taken substantially on line 3—3 of FIGURE 1.

FIGURE 4 is a schematic wiring diagram showing the cell of FIGURES 1 to 3 connected in an improved gas detecting circuit according to the present invention.

Referring to the drawings, 11 generally designates an improved radio frequency gas detector cell according to the present invention, said cell being adapted to be employed in a gas chromatography system generally similar to that described in my previously filed copending patent application, Serial No. 34,134, filed June 6, 1960, now Patent No. 3,128,427. As explained in said prior application, a series ballast coil is used which surrounds the cell electrodes, producing an external electric field. The ballast coil comprises a plurality of turns wound on a suitable insulating form, for example of ceramic material, and has a resonance frequency substantially the same as the frequency of the driving oscillator. The core of this inductor consists of the outer cell electrode, which may be of suitable impervious conductive material. The inductor has an effective heat dissipation sufficient to raise the temperature of the gas passing through the cell to a value high enough so that some of its atoms acquire so much energy that ionization can occur through mutual collision. However, the prime factor causing ionization is the radio frequency field.

The cell 11 comprises a generally cylindrical metallic main housing 12 having top and bottom annular flanges 13 and 14. Secured to the bottom flange 14 by a plurality of bolts 15 is a circular metal bottom wall 16, an annular resilient deformable sealing gasket 17 being interposed between flange 14 and said bottom wall. A generally circular metal top wall 18 is similarly secured to top flange 13 by bolts 19, with a resilient deformable sealing gasket 20 interposed between flange 14 and said top wall 18.

An annular centering plate 21 is secured on bottom wall 16 by bolts 22, said plate 21 being formed with an upstanding central collar portion 23 in which the vertical ceramic coil form 24 is secured, for example, by fastening screws 25. The ballast coil 26 is wound on the form 24. A radio frequency input terminal 27 is mounted in the bottom of the cell, extending through and being suitably insulated from bottom wall 16 and plate 21. The inner end of the terminal 27 is connected to the bottom end of coil 26.

Removably secured axially in the upper portion of coil form 24 is generally cylindrical hollow electrode 28 which may be of suitable chemically impervious metal such as platinum, niobium, molybdenum, or other metal of this class. The electrode 28 has a cylindrical bore 29 which terminates at a substantially hemispherical bottom bore portion 30. The form 24 is positively centered by a centering pin 31 which is rigidly secured in the center of bottom wall 16 and is tightly received in an axial bottom bore portion 32 in the form 24, the pin 31 terminating a substantial distance below the bottom end of electrode 28.

The top of form 24 is formed with an enlarged counterbore 33, the electrode 28 terminating in said counterbore well below the top plane of coil form 24, as is clearly shown in FIGURE 1. The top portion of electrode 28 is electrically connected to the top end of coil 26.

The metal top wall 18 is centrally formed with an upstanding integral boss 34 having a central gas inlet passage 35 and a gas outlet passage 36 spaced laterally therefrom.

Threadedly secured in the bottom of passage 35 is a flanged fitting 37, sealed relative to the bottom surface of wall 18 by a gold washer 38. Rigidly secured axially in the fitting 37 is a platinum tube 39 which extends axially through a substantial portion of bore 29 and which is provided on its lower end with a platinum sleeve 40 to provide the proper clearance relative to the inside surface of the bore 29.

Gas is admitted into the cell through a conduit 41 connected to the top end of passage 35. The gas leaves the cell through a conduit 42 connected by means of a suitable fitting 43 to the top end of passage 36.

The carrier gas enters the cell through the small platinum tube 39, which is the grounded portion of the cell geometry, and directs the carrier gas to the center of the hemispherical bottom bore portion 30 of the radio frequency electrode 28. The gas then passes up along the surface of the electrode bore 29 and vents at the top of the bore.

The clearance between the sleeve 40 and the bore 29 is preferably of the order of 0.02 inch. When the radio frequency electrode 28 is charged, the glow discharge takes place from the cylindrical wall of bore 29 and the tip member 40. From this the carriage gas becomes ionized.

As is explained in the above-mentioned copending application, Serial No. 34,134, the associated oscillator provides a suitable radio frequency voltage, for example, at a frequency of 27 megacycles. The carrier gas, for example, helium, from the chromatographic column passes through the cell at a constant flow rate, at almost atmospheric pressure. A voltge range is used which provides a glow discharge, which is made possible by the use of the series ballast to regulate and control the current flow through the gas stream after ionization has taken place. By adjustment of the plate current of the associated oscillator tube the current through the detector cell is controlled so that a direct current component of somewhat less than 200 microamperes is obtained. The direct current component is quite stable with steady radio frequency current. As is pointed out in the aforementioned copending application Serial No. 34,134, the radio frequency rectified current will remain constant provided:

(1) The helium carrier gas stream is pure.
(2) The voltage applied to the cell electrode 28 is constant.
(3) The temperature remains constant.
(4) The flow rate of the gas is constant.

A change in any one of these factors causes a disturbance within the cell, which in turn causes the rectified direct current component to change to a lesser or greater degree, depending on the conditions causing the change.

FIGURE 4 illustrates a preferred circuit which may be employed to detect and record a signal consisting of a change in the rectified current component. FIGURE 4 comprises a bridge circuit wherein one arm carries the direct current component generated by the radio frequency glow discharge. This arm extends from a junction point 44 through a meter 45, a resistor 46, a radio frequency filter 47, the terminal 27, the ballast coil 26, and the cell 11 to ground. An opposite arm, in the form of a balancing circuit extends from a junction point 48 through another meter 49 and a switch 50 to the positive terminal 51 of a constant voltage direct current supply source, the supply source having a grounded negative terminal, with a current adjusting network 70 being provided. Thus, one branch of this adjusting network 70 extends through a resistor 52 to an adjustable decade switch contact 53 selectively engageable with any one of a number of associated stationary contacts 54 between which are connected respective decade resistors 55, the final stationary contact, shown at 54', being grounded. Another branch extends through a resistor 75 to another adjustable decade switch contact 56 selectively engageable with stationary contacts 57, which are connected to the contacts 54, the final stationary contact, shown at 57', being grounded. The series-connected chain of resistors 55 are connected through a resistor 58 to the positive supply terminal 51. A third branch extends through a resistor 59 to the adjustable contact 71 of a potentiometer 60 whose winding is connected between ground and the supply terminal 51 through the resistor 58. Adjustable switch contact 56 provides a coarse balancing adjustment, adjustable switch contact 53 provides a medium balancing adjustment, and potentiometer 60 provides a fine balancing adjustment.

Third and fourth bridge arms comprise respective resistors 61 and 62 connected between junction points 44 and 48 and ground.

Junction points 44 and 48 may be considered as the output terminals of the bridge. The winding 63 of an attenuator potentiometer 64 is connected across said output terminals, and a conventional recorder may be connected between the sensitivity-adjusting contact 65 of the potentiometer 64 and the terminal 48.

In operation, the adjusting network 70 may be initially set to provide equal d.c. voltages at the junction terminals 44 and 48, so that no current flows through the potentiometer winding 63. When a change in one of the above-mentioned factors occurs, causing a disturbance within the cell, a corresponding change in current occurs in the bridge arm containing the cell, thus unbalancing the voltages at the junction points 44 and 48, producing current flow through winding 63, and causing a corresponding signal to be recorded.

The circuit of FIGURE 4 imposes a relatively low current drain on the rectified radio frequency current source (the cell 11), providing high workable sensitivity, excellent base line stability, and the ability to detect relatively small amounts of foreign material in the carrier gas. With the circuit initially balanced, as above described, when a foreign gas passes through the cell, a change in rectified radio frequency potential occurs at point 44, causing a corresponding current to flow through the attenuator winding 63.

It will be noted that the top wall 18 of the cell 11 may be readily unfastened and removed, carrying with it the platinum tube 39. This enables the radio frequency electrode 28 to be exposed for cleaning or removal.

The following table gives the values of the main resistive components in a typical embodiment of the detecting and recording circuit of FIGURE 4:

| Component | Units | Value |
|---|---|---|
| Resistor 58 | ohms | 40,000 |
| Resistors 55 | ohms each | 10,000 |
| Potentiometer 60 | ohms | 100,000 |
| Resistor 59 | megohms | 10 |
| Resistor 75 | ohms | 250,000 |
| Resistor 52 | megohms | 1.65 |
| Resistor 61 | do | 2.2 |
| Resistor 62 | do | 2.2 |
| Attenuator 63 | ohms | 2000 |

While a specific embodiment of an improved radio frequency gas detector cell and associated circuitry have been disclosed in the foregoing description, it will be understood that various modifications within the spirit of the invention may occur to those skilled in the art. Therefore it is intended that no limitation be placed on the invention except as defined by the scope of the appended claims.

What is claimed is:

1. In a gas chromatography apparatus, a detection cell comprising a gas sampling chamber of conductive material, a coil form of insulating material mounted in said chamber, a ballast coil wound on said form, a hollow metal electrode mounted in said form and defining a core for said coil, one wall of said chamber being formed with a gas inlet passage, a metal gas inlet tube secured in said passage and extending into said electrode, said inlet tube being conductively connected to said chamber, said chamber being provided with a gas outlet passage spaced from said inlet passage, conductor means connecting said electrode to one end of said coil, a radio frequency input terminal mounted in and insulated from a wall portion of said chamber, and conductor means connecting said terminal to the other end of said coil.

2. In a gas chromatography apparatus, a detection cell comprising a gas sampling chamber of conductive material, a coil form of insulating material mounted in said chamber, a ballast coil wound on said form, a hollow metal electrode mounted in said form and defining a core for said coil, said chamber having a removable wall facing said electrode, said wall being formed with a gas inlet passage, a metal gas inlet tube secured in said passage and extending into said electrode, said inlet tube being conductively connected to said chamber, said removable wall being provided with a gas outlet passage spaced from said inlet passage, conductor means connecting said electrode to one end of said coil, a radio frequency input terminal mounted in and insulated from another wall portion of said chamber, and conductor means connecting said terminal to the other end of said coil.

3. In a gas chromatography apparatus, a detection cell comprising a grounded metal sampling chamber, a coil form of insulating material mounted in said chamber, a ballast coil wound on said form, a hollow metal electrode having an open end mounted axially in said form and defining a core for said coil, said chamber having a metal wall adjacent the end of said form and facing the open end of said electrode, said wall being formed with a gas inlet passage aligned with said electrode, said wall being formed with a gas outlet passage spaced from said inlet passage, a metal gas inlet tube axially secured in said inlet passage and extending into said electrode, said inlet tube being conductively connected to said chamber, conductor means connecting said electrode to one end of said coil, a radio frequency input terminal mounted in and insulated from another wall portion of said chamber, and conductor means connecting said terminal to the other end of said coil.

4. The structure of claim 3, and wherein said metal electrode has a substantially hemispherical inner end wall surface opposite said open end.

5. The structure of claim 3, and wherein said first-named wall is detachably secured to the chamber.

6. In a gas chromatography apparatus, a detection cell comprising a generally cylindrical grounded metal sampling chamber having a bottom end wall, a coil form of insulating material mounted axially on said bottom end wall of the chamber, a ballast coil wound on said form, a hollow metal electrode having an open top end mounted axially in the upper portion of said form with its open end exposed at the top of the form, said electrode defining a core for the coil, said chamber having a removable metal top end wall adjacent the top end of the form and facing the open end of the electrode, said top wall being formed with a gas inlet passage aligned with said electrode and with a gas outlet passage spaced from said inlet passage, a metal gas inlet tube axially secured in said inlet passage and extending into said electrode, said inlet tube being conductively connected to said chamber and defining a grounded electrode, conductor means connecting the first-named hollow electrode to the top end of the coil, a radio frequency input terminal mounted in and insulated from said bottom end wall, and conductor means connecting said terminal to the bottom end of said coil.

7. The structure of claim 6, and wherein said first-named electrode has a hemispherical bottom inside end wall and the end of said gas inlet tube is provided with an external metal sleeve extending adjacent the inside surface of the first-named electrode with a spacing therefrom of the order of 0.02 inch.

References Cited by the Examiner
UNITED STATES PATENTS

| | | | |
|---|---|---|---|
| 2,963,601 | 12/1960 | Varnerin et al. | 324—33 X |
| 3,126,512 | 3/1964 | Zito | 324—33 |
| 3,128,427 | 4/1964 | Hampton | 324—33 |

GEORGE N. WESTBY, *Primary Examiner.*

D. E. SRAGOW, *Assistant Examiner.*